United States Patent
Wang (10) Patent No.: US 10,365,391 B2
(45) Date of Patent: Jul. 30, 2019

(54) APPARATUS AND METHODS FOR MAKING AZIMUTHAL RESISTIVITY MEASUREMENTS WITH OFF-SET DIRECTIONAL ANTENNAS

(71) Applicant: WELL RESOLUTIONS TECHNOLOGY, Houston, TX (US)

(72) Inventor: Tsili Wang, Houston, TX (US)

(73) Assignee: Well Resolutions Technology, Houston, TX (US)

( * ) Notice: Subject to any disclaimer, the term of this patent is extended or adjusted under 35 U.S.C. 154(b) by 4 days.

(21) Appl. No.: 15/700,093

(22) Filed: Sep. 9, 2017

(65) Prior Publication Data

US 2018/0074219 A1    Mar. 15, 2018

Related U.S. Application Data

(60) Provisional application No. 62/385,438, filed on Sep. 9, 2016.

(51) Int. Cl.
| | | |
|---|---|---|
| *G01V 3/12* | (2006.01) | |
| *G01V 3/30* | (2006.01) | |
| *G01V 3/28* | (2006.01) | |
| *G01V 3/26* | (2006.01) | |

(52) U.S. Cl.
CPC .............. *G01V 3/12* (2013.01); *G01V 3/28* (2013.01); *G01V 3/30* (2013.01); *G01V 3/26* (2013.01)

(58) Field of Classification Search
CPC ... G01V 3/12; G01V 3/26; G01V 3/28; G01V 3/30
See application file for complete search history.

(56) References Cited

U.S. PATENT DOCUMENTS

| | | | |
|---|---|---|---|
| 9,268,053 B2 | 2/2016 | Wang | |
| 9,645,276 B2 | 5/2017 | Wang | |
| 2009/0230968 A1* | 9/2009 | Bittar | E21B 47/024 324/338 |
| 2014/0368197 A1* | 12/2014 | Wang | G01V 3/12 324/333 |
| 2016/0216397 A1 | 7/2016 | Donderici et al. | |

FOREIGN PATENT DOCUMENTS

WO    2017078916 A2    5/2017

OTHER PUBLICATIONS

Int'l Search Report & Written OPinion (PCT/US2017/050894), dated Nov. 24, 2017.

* cited by examiner

Primary Examiner — Patrick Assouad
Assistant Examiner — Haidong Zhang
(74) Attorney, Agent, or Firm — Gregory L. Porter; Hunton Andrews Kurth LLP (57) ABSTRACT

A resistivity measuring tool used in a drillstring having a drill bit on a distal end for drilling a wellbore in a formation includes a tool body having a longitudinal axis, a pair of transmitter antennas having magnetic moments parallel to the longitudinal axis of the tool body, and a pair of receiver antennas radially spaced from the longitudinal axis of the tool body and having transverse magnetic moment components pointed in opposite directions, wherein at least one of the receiver antennas has a transverse magnetic moment angled with respect to a component normal to the longitudinal axis of the tool body.

11 Claims, 11 Drawing Sheets

APPARATUS AND METHODS FOR MAKING AZIMUTHAL RESISTIVITY MEASUREMENTS WITH OFF-SET DIRECTIONAL ANTENNAS

CROSS-REFERENCE TO RELATED APPLICATIONS

This application claims priority under 35 U.S.C. § 119(e) to U.S. Provisional Application Ser. No. 62/385,438, filed on Sep. 9, 2016, the entirety of which is hereby incorporated herein by reference.

BACKGROUND

Azimuthal resistivity measurement while drilling has been widely used for tracking bed boundaries during geosteering operations. The information about the direction of and distance to a bed boundary is important in landing a well in right spots (e.g., pay zones). The measurement may also be used for resolving formation resistivity anisotropy properties for reservoir formation evaluation.

One key component in azimuthal resistivity measurement is azimuthal antennas. It is different from a non-azimuthal antenna in that the radiation pattern of the former will change as the tool rotates, whereas that of the latter does not. Two major types of azimuthal antennas have been used in making azimuthal resistivity measurements. The first is a transversal antenna which has its direction of magnetic moment normal to the longitudinal axis of a tool. Examples include those taught by Wang in U.S. Pat. No. 9,268,053. The second is a tilted antenna with its magnetic moment oriented at an angle from the longitudinal axis of a tool. In either way, the azimuthal antenna will be centered on the tool axis. Depending on the type of azimuthal antennas used, the voltage signals acquired may be used in different ways to derive information about bed boundaries for geosteering applications. For instance, with transversal antennas, the voltage signals (in-phase, out-of-phase or both) may be processed directly for bed boundary information. For tilted antennas, however, the voltage signals must first be processed to remove non-azimuthal component. This usually done with the help of tool rotation because the non-azimuthal component usually does not depend on tool face angle and may be removed.

One serious challenge to any azimuthal resistivity measurement is temperature effects. At higher temperatures, antennas and associated electronics will change their characteristics with temperature. The measured signals or derived quantities will then display temperature dependent variations. More than often, the variations may severely distort, or even mask, the information about the surrounding formations. Therefore, any azimuthal resistivity measurement should be compensated for temperature effect. In conventional (propagation) resistivity measurement, this is done by employing a dual-receiver and dual-transmitter antenna configuration. For the method to work, two receiver antennas are placed in between two transmitter antennas. The two receiver antennas are spaced apart in the longitudinal direction by, e.g., a few inches. The same couple of receiver antennas are used to measure signal attenuation and phase difference responses for both transmitter antennas (fired sequentially). Taking average of the attenuations or phase differences will largely remove temperature effects.

Applying the same principle to azimuthal resistivity measurement would similarly require at least two azimuthal receiver antennas to be spaced apart along the tool axis. Because azimuthal receiver antennas usually are employed together with non-azimuthal receiver antennas to form a complete resistivity measurement, spacing apart the azimuthal receiver antennas would either substantially increase the tool length or become practically difficult to implement.

Figure 1:
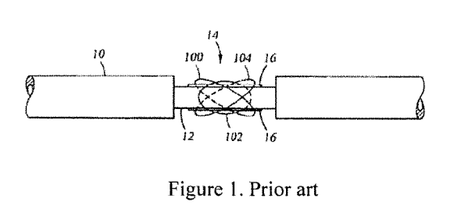
FIG. 1 illustrates two tiled antennas of a prior art tool.

It is possible to co-locate two azimuthal receiver antennas to eliminate the requirement for additional tool length. However, the close proximity of the antennas will inevitably cause signal interference between them, thus reducing the sensitivity of the measured azimuthal signals to adjacent boundaries. For instance, two tilted antennas as shown in FIG. 1 will leave their windings electromagnetically exposed to each other, causing the antennas picking up each other's signal. Thus, there are needs to improve the azimuthal measurements with different directional antennas.

SUMMARY OF THE INVENTION

In one aspect, embodiments disclosed here relate to a resistivity measuring tool used in a drillstring having a drill bit on a distal end for drilling a wellbore in a formation, including a tool body having a longitudinal axis, a pair of transmitter antennas having magnetic moments parallel to the longitudinal axis of the tool body, and a pair of receiver antennas radially spaced from the longitudinal axis of the tool body and having transverse magnetic moment components pointed in opposite directions, wherein at least one of the receiver antennas has a transverse magnetic moment angled with respect to a component normal to the longitudinal axis of the tool body.

DETAILED DESCRIPTION

Figure 2:
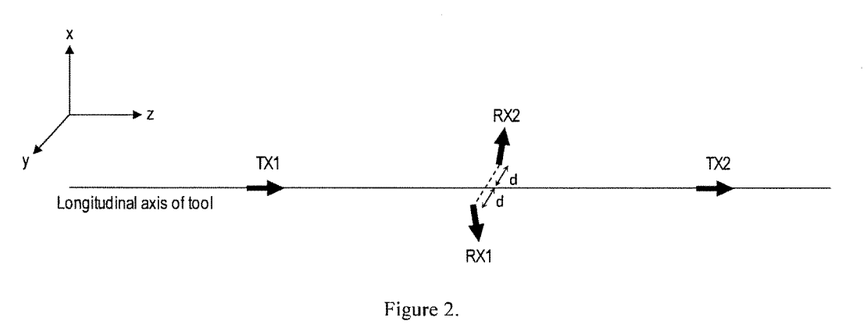
FIG. 2 illustrates an antenna layout for azimuthal resistivity measurement according to one or more embodiments.

An apparatus and method will be described according to this invention for making an azimuthal resistivity measurement. FIG. 2 shows an example of the antenna arrangement according to the current invention. The apparatus consists of a pair of transmitter antennas, TX1 and TX2, mounted on a drill collar. The transmitter antennas have their moments parallel to the longitudinal direction. The apparatus also has a pair of elemental azimuthal receiver antennas, RX1 and RX2, located in between the couple of transmitter antennas. Each azimuthal receiver antenna has a transversal (x-) component. The two azimuthal receiver antennas practically occupy the same longitudinal position on the drill collar. They are spaced apart in the y-direction from the longitudinal axis of the tool. Moreover, both azimuthal receiver antennas are located in the middle point between the two transmitter antennas, though this is not required. The two azimuthal receiver antennas have their transversal components pointing in opposite directions. As least one of the azimuthal receiver antennas has its magnetic moment pointing differently from the x-direction. The apparatus may also have one or more non-azimuthal receiver antennas primarily for measuring the resistivity of the surrounding medium.

Figure 3:
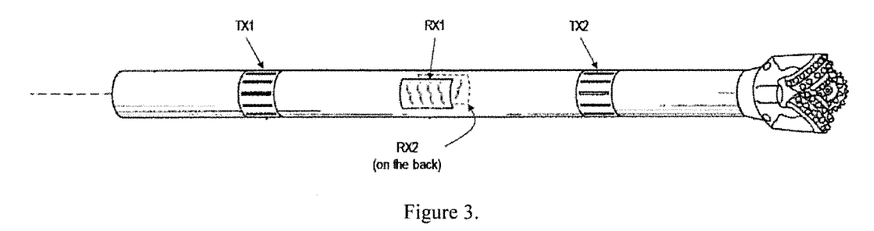
FIG. 3 illustrates an azimuthal antenna array on a drill collar according to one or more embodiments.
Figure 4:
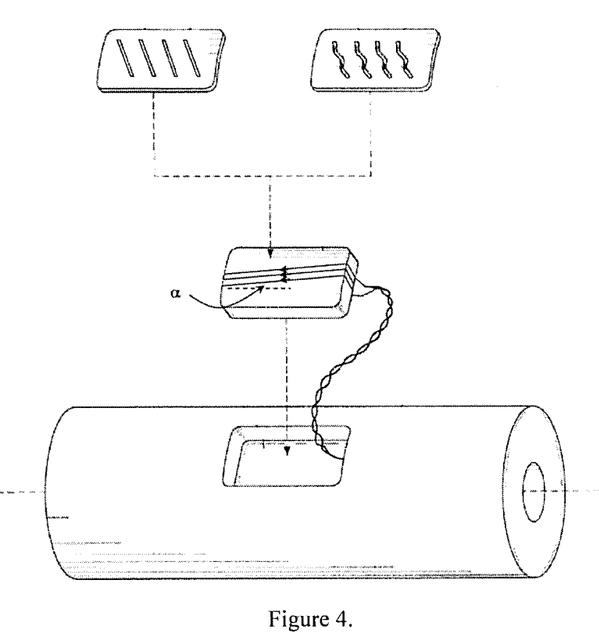
FIG. 4 illustrates an exploded view of a azimuthal antenna construction according to one or more embodiments.

The above antenna array may be constructed on a drill collar as shown in FIG. 3. The two transmitter antennas may be constructed in any way known for a non-azimuthal resistivity measurement tool. The two azimuthal receiver antennas are preferably positioned 180° apart on the circumference of a drill collar. The construction of the azimuthal receiver antennas is exemplified in FIG. 4. An antenna pocket is first machined near the outer diameter of a drill collar. The pocket is about 1 inch deep, 4 inches wide, and 5 inches long. An antenna body made of non-conducting, preferably ferritic, materials, is then dropped in the pocket. The cross section of the antenna body may be shaped as a square, a rectangle, a circle, or any suitable shape. The preferable shape of the cross section is a rectangle. An insulated antenna wire is wound around the antenna body. Each loop of the windings forms a winding plane. The winding planes of adjacent windings are parallel to each other that are at an angle, a, from the longitudinal axis of the tool. The angle α may vary from 0° to 45° and preferably are less than 10°. The two ends of the windings are extended to a close by a pocket (not shown) in the collar where the wires are further connected to electronic boards. A tuning circuit (not shown) may also be placed in the pocket which serves to tune the antenna to desired reception frequencies.

Figure 5:
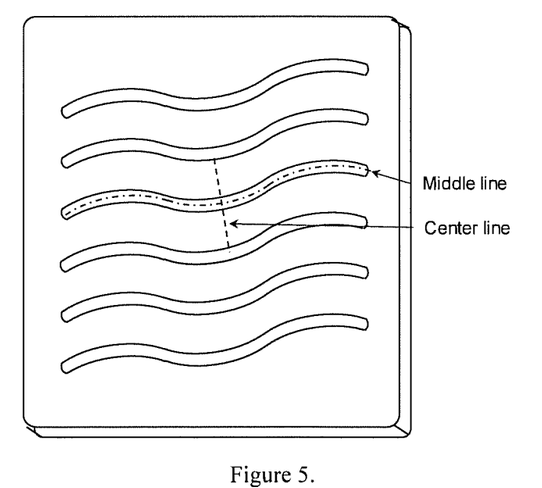
FIG. 5 illustrates an azimuthal antenna shield according to one or more embodiments.
Figures 6, 7:
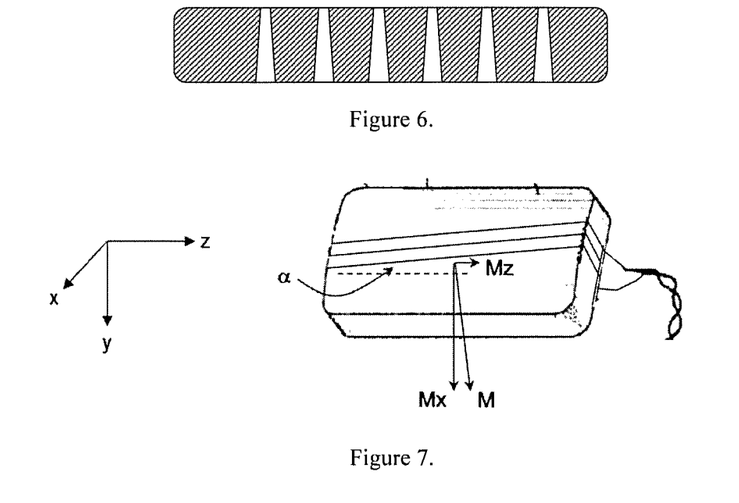
FIG. 6 illustrates a cross section view of an azimuthal antenna shield according to one or more embodiments.
FIG. 7 illustrates windings of azimuthal antenna and magnetic moments according to one or more embodiments.

The antenna body and windings may be covered with an antenna shield made of abrasion resistant materials, e.g., Inconel, for protection of hostile drilling environment. Refer to FIG. 5 for an example of the shield. The shield contains at least one slot to permit passage of an electromagnetic signal to the antenna. The slots are filled with non-conducting materials such as PEEK or PEK. The slot may be straight or more preferably curved. Curved slots have the advantages of better protecting the filling materials from being worn by drilling operations. As shown in FIG. 5, each curved slot will have a center line and a middle line. The center line is parallel to the winding planes. The middle line will be fully symmetrical with respect to the center line. The middle points of all the slots form a straight line that is parallel to the longitudinal axis of the tool. To help retain the filling materials in the slots, the slots may further be shaped in cross sections as wedges, as shown in FIG. 6, with the outer openings smaller than the inner openings.

When the winding planes of the azimuthal receiver antenna are rotated around the y-axis, the total magnetic moment of the antenna will point away from the x-axis. Refer to FIG. 7. The total magnetic moment will have an x-component and a z-component such that $$Mx = M \cdot \cos \alpha \qquad \text{Equation 1}$$

$$Mz = M \cdot \sin \alpha. \qquad \text{Equation 2}$$

Figure 8:
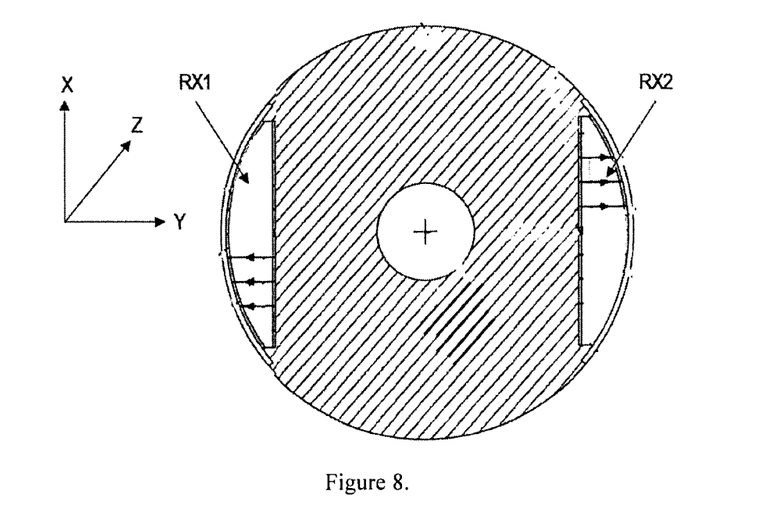
FIG. 8 illustrates two azimuthal antennas spaced 180 degrees apart on the circumference of a tool according to one or more embodiments.

By restricting the winding planes to be parallel with the y-axis, the antenna will not be sensitive to a y-directed electromagnetic field. A second azimuthal antenna may be constructed, preferably, 180° apart along the circumference of the collar. See FIG. 8. The axial component of the second azimuthal antenna will be in the same direction as the first one, but the transversal components of the two receiver antennas will be in opposite directions.

It is possible to introduce a z-component in the total magnetic moment by restricting the winding planes to be parallel to the z-axis and allowing the centerlines of the shield slots to be at an angle from the z-axis. It may also be possible to introduce a z-component in the total magnetic moment by restricting the centerlines of the shield slots to be parallel to the z-axis and the winding planes at an angle from the z-axis.

In operation, a first transmitter antenna TX1 is energized to emit electromagnetic energy into the surrounding medium. Secondary electromagnetic energy will be induced in a conducting medium near the antenna. The secondary electromagnetic energy will radiate outward from the conducting medium and be picked up by the azimuthal receiver antennas RX1 and RX2. The same energy may also be picked up by non-azimuthal receiving antennas (not shown) which may yield information about the resistivity of the surrounding medium.

Let the voltage signals from RX1 and RX1 be $V_{11}$ and $V_{12}$, where the first subscript stands for the numbering of transmitter antenna and the second subscript for the number of receiver antenna. Each voltage signal can be a complex number with an in-phase part and an out-of-phase part. A ratio may be taken between $V_{11}$ and $V_{12}$ such that $$r_1 = \frac{V_{11}}{V_{12}} \qquad \text{Equation 3}$$

which can be expressed as $$r_1 = A_1 e^{i\varphi_1} \text{ where } A_1 = \left|\frac{V_{11}}{V_{12}}\right| \qquad \text{Equation 4}$$

is the amplitude ratio of the two voltage signals and $\varphi_1 = \varphi_{11} - \varphi_{12}$ is the phase difference between the two. Next, a second transmitter antenna TX2 is activated, producing two voltage signals from the same set of receiver antennas, $V_{21}$ and $V_{22}$. A ratio between the two voltage signals is calculated similarly, $$r_2 = \frac{V_{22}}{V_{21}} = A_2 e^{i\varphi_2} \qquad \text{Equation 5}$$

Finally, a geometrical average of the two ratios is calculated $$\bar{r} = \sqrt{r_1 r_2} = \left(\frac{V_{11}}{V_{12}} \cdot \frac{V_{22}}{V_{21}}\right)^{1/2} = \sqrt{A_1 A_2}\, e^{i(\varphi_1 + \varphi_2)/2} \qquad \text{Equation 6}$$

Taking logarithm of $\bar{r}$ yields $$\log \bar{r} = \frac{1}{2}(\log A_1 + \log A_2) + i\frac{1}{2}(\varphi_1 + \varphi_2)\log e \qquad \text{Equation 7}$$

Define the average attenuation as $$AT = \frac{1}{2}(20\log A_1 + 20\log A_2) \qquad \text{Equation 8}$$

and the average phase difference as $$PD = \frac{1}{2}(\varphi_1 + \varphi_2) \qquad \text{Equation 9}$$

Figure 9:
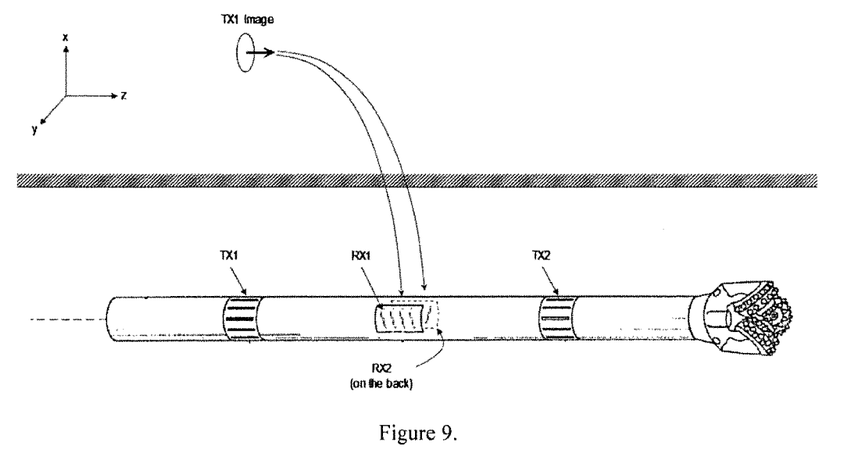
FIG. 9 illustrates boundary effect on an azimuthal antenna as represented by a mirror image of the transmitting antenna according to one or more embodiments.

To shed a light on the above equations, consider a geological bed boundary adjacent to the above antenna array. Let the tool axis be parallel with the bed boundary. The x-axis is normal to the bed boundary so that the two azimuthal receiver antennas are centered on the y-axis. The voltage signal received by an azimuthal antenna will consist of two parts, one propagating directly from the transmitter antenna and the other from the reflection of the bed boundary. It is easy to understand that the direct signals received by the azimuthal antenna will only have a z-component. The reflection from the bed boundary carries important information about the azimuth and distance to the bed boundary. The reflection will also contain information about the bed resistivity on the other side of the boundary. Conceptually the reflection may be represented by an image transmitter symmetrical with respect to the bed boundary to the actual transmitter, as shown in FIG. 9. The voltage signals produced while the first transmitter fires can be expressed as $$V_{11} = i\omega\mu M_{T1} M_{R1}(H_{zz1}\sin\alpha + H_{zx1}\cos\alpha) \qquad \text{Equation 10}$$
$$= V_{zz1}\sin\alpha + V_{zx1}\cos\alpha$$

-continued $$V_{12} = i\omega\mu M_{T1} M_{R2}(H_{zz1}\sin\alpha - H_{zx1}\cos\alpha) \qquad \text{Equation 11}$$
$$= V_{zz1}\sin\alpha - V_{zx1}\cos\alpha$$

In the above equations, $H_{zx1}$ is the magnetic field produced by the bed boundary or equivalently the image transmitter. $M_{T1}$ is the magnetic moment of the first transmitter antenna. $M_{R1}$ and $M_{R2}$ are the magnetic moments of the two receiver antennas. The ratio between the two becomes $$r_1 = \frac{V_{zz1}\sin\alpha + V_{zx1}\cos\alpha}{V_{zz1}\sin\alpha - V_{zx1}\cos\alpha} \qquad \text{Equation 12}$$

which may further be reduced to $$r_1 = \frac{1 + V_{zx1}/V_{zz1}\cot\alpha}{1 - V_{zx1}/V_{zz1}\cot\alpha} \qquad \text{Equation 13}$$

For practical reasons, $|V_{zx1}/V_{zz1} \cot\alpha|$ can be much smaller than 1, especially when the bed boundary is far from the tool. In this case, the above equation can be approximated as $$r_1 \approx (1 + V_{zx1}/V_{zz1}\cot\alpha)^2 \approx 1 + 2V_{zx1}/V_{zz1}\cot\alpha \qquad \text{Equation 14}$$

It is clear from Equation 14 that the voltage ratio in Equation 3 carries the azimuthal sensitivity to the bed boundary offered by the transversal voltage signal component $V_{zx1}$.

In the above, we have assumed that the transversal components of the measured voltage signals are in the x- or −x-direction. When the tool rotates around its longitudinal axis, the transversal component of the voltage signal will vary with tool face angle as follows, $$V_{zx1} = V_{zx1}^0 \cos(TF - TF_0) \qquad \text{Equation 15}$$

where $TF_0$ is a baseline tool face angle. Plugging Equation 15 into Equation 14 yields:

$$r_1 \approx 1 + 2V_{zx1}^0 \cos(TF - TF_0)/V_{zx1}\cot\alpha \qquad \text{Equation 16}$$

Figure 10:
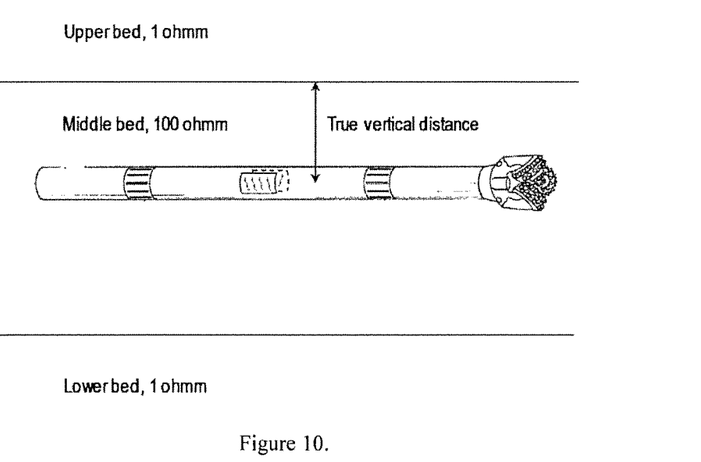
FIG. 10 illustrates a three-bed formation model according to one or more embodiments.
Figure 11:
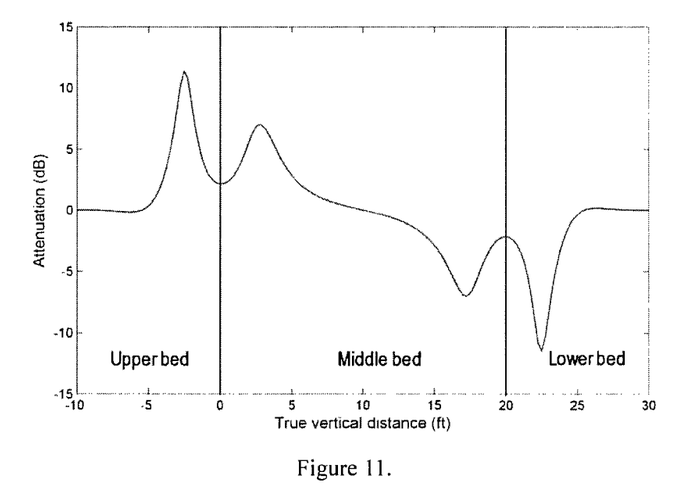
FIG. 11 illustrates azimuthal attenuation response to the three-bed formation model of FIG. 10.
Figure 12:
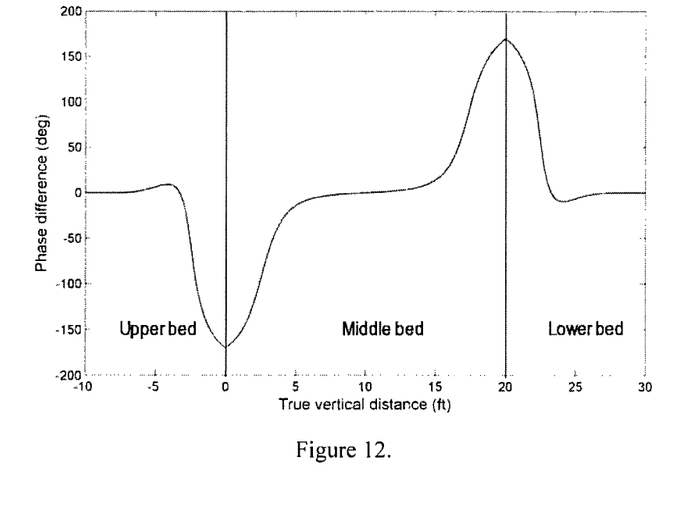
FIG. 12 illustrates azimuthal phase difference to the three-bed formation model of FIG. 10.

To illustrate the azimuthal sensitivity of the antenna array depicted in FIG. 3, a three-layer formation model is considered in FIG. 10. Both the upper and lower beds are conducting with a low resistivity value of 1 ohmm. The middle bed simulates a hydrocarbon bearing reservoir with a high resistivity value of 100 ohmm. One task of geosteering during horizontal drilling is to distinguish the upper bed from the lower bed, when the tool approaches a conducting bed. Such a task cannot be fulfilled with a non-azimuthal resistivity measurement. FIG. 11 and FIG. 12 show the attenuation and phase difference responses of the azimuthal receiver antenna array at various distances from the top bed boundary, assuming that the tool is parallel with the boundaries. When the tool is between the top and bottom bed boundaries, the attenuation response will either be positive or negative, depending on whether the tool is closer to the top boundary or the bottom boundary. So will the phase difference response. This clearly shows the azimuthal antenna array has a strong sensitivity to the azimuth of an adjacent bed boundary.

Figure 13:
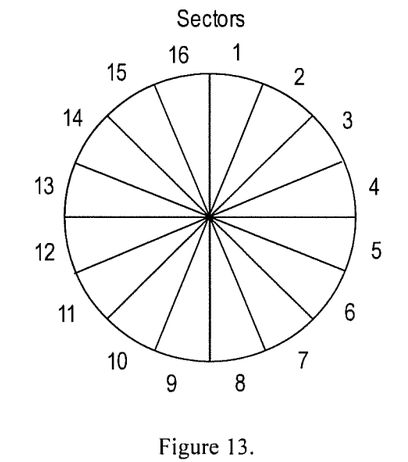
FIG. 13 illustrates azimuthal sectors according to one or more embodiments.
Figure 14:
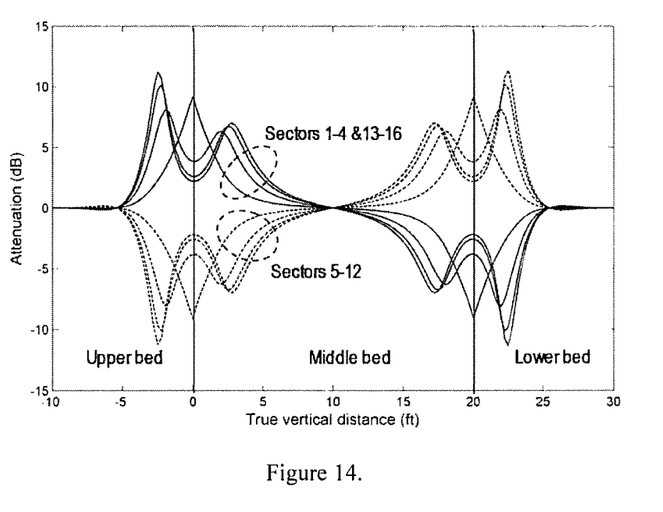
FIG. 14 illustrates azimuthal attenuation responses at the various sectors of FIG. 13.
Figure 15:
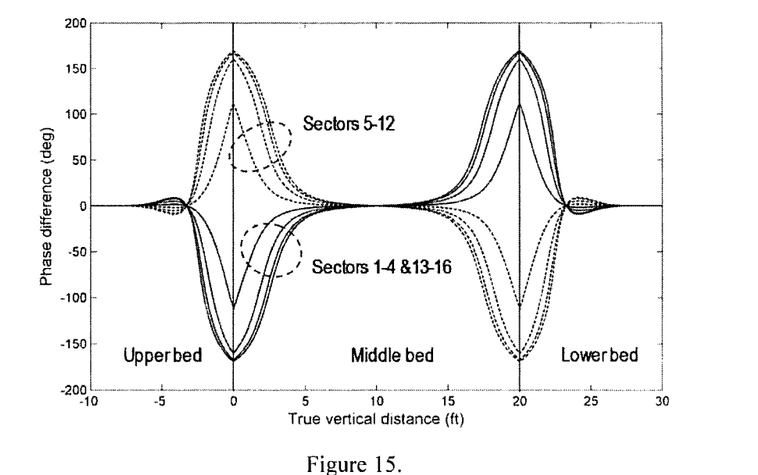
FIG. 15 illustrates azimuthal phase difference responses at the various sectors of FIG. 14.

In the above calculation, the two receiver antennas have their magnetic moments aligned within the x-z plane. As the antenna rotates around the tool axis, the responses will vary with the tool face angle. As an example, the entire circumference is divided into 16 equal sectors, as shown in FIG. 13. This variation is shown in FIG. 14 and FIG. 15.

Equation 16 relates the voltage ratio to the transversal and axial components of the voltage signal. A similar voltage ratio can be derived for the second transmitter antenna, $$r_2 \approx 1 + 2 V_{zx2}^0 \cos(TF - TF_0)/V_{zx2} \cot \alpha \qquad \text{Equation 17}$$

The geometrical average of the two voltage ratios as in defined Equation 6 can be written as, $$\bar{r} = \sqrt{r_1 r_2} = \left\{ \begin{array}{l} \left[1 + 2\dfrac{V_{zx1}^0}{V_{zz1}\cot\alpha}\cos(TF - TF_0)\right] \\ \left[1 + 2\dfrac{V_{zx2}^0}{V_{zz2}\cot\alpha}\cos(TF - TF_0)\right] \end{array} \right\}^{1/2} \approx \qquad \text{Equation 18}$$

$$1 + \left(\dfrac{V_{zx1}^0}{V_{zz1}\cot\alpha} + \dfrac{V_{zx2}^0}{V_{zz2}\cot\alpha}\right)\cos(TF - TF_0)$$

In the above, we have assumed that $$\left|\dfrac{V_{zx1}^0}{V_{zz1}\cot\alpha}\right| \ll 1, \qquad \text{Equation 19}$$

$$\left|\dfrac{V_{zx2}^0}{V_{zz2}\cot\alpha}\right| \ll 1. \qquad \text{Equation 20}$$

Taking the logarithm of Equation 18 results in $$\log \bar{r} \approx \left(\dfrac{V_{zx1}^0}{V_{zz1}\cot\alpha} + \dfrac{V_{zx2}^0}{V_{zz2}\cot\alpha}\right)\cos(TF - TF_0) \qquad \text{Equation 21}$$

From Equation 21, it is clear that at the tool rotates $\log \bar{r}$ will vary as a cosine function of tool face angle. In the special case where rock formations are pancake layered and the tool is parallel to the layer boundaries, then the transversal components of the voltage signals for two symmetric axial transmitter antennas will be the same and Equation 21 further reduces to $$\log \bar{r} \approx 2\dfrac{V_{zx}^0}{V_{zz}\cot\alpha}\cos(TF - TF_0) \qquad \text{Equation 22}$$

which can be expressed in terms of the amplitudes and phases of $V_{zx}$ and $V_{zz}$, $$\log \bar{r} \approx 2\dfrac{A_{zx}}{A_{zz}\cot\alpha}e^{i(\varphi_{zx} - \varphi_{zz})}\cos(TF - TF_0) \qquad \text{Equation 23}$$

Comparing Equation 23 to Equation 7 it is clear the attenuation is related to the in-phase part of the right side of Equation 23, $$AT \sim \dfrac{A_{zx}}{A_{zz}\cot\alpha}\cos(\varphi_{zx} - \varphi_{zz})\cos(TF - TF_0) \qquad \text{Equation 24}$$

and the phase difference is related to the out-of-phase part, $$PD \sim \dfrac{A_{zx}}{A_{zz}\cot\alpha}\sin(\varphi_{zx} - \varphi_{zz})\cos(TF - TF_0) \qquad \text{Equation 25}$$

Therefore, both attenuation and phase difference responses will show variation with tool rotation as cosine functions of tool face angle.

Figure 16:
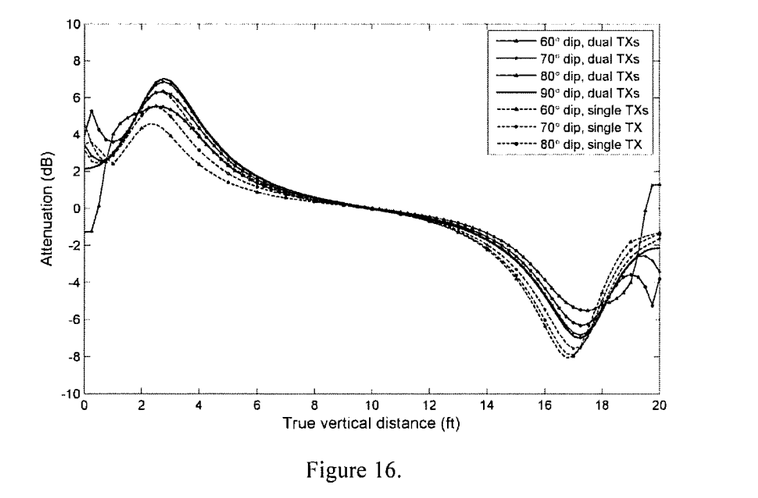
FIG. 16 illustrates azimuthal attenuation responses of single-transmitter and dual-transmitter antenna arrays according to one or more embodiments.
Figure 17:
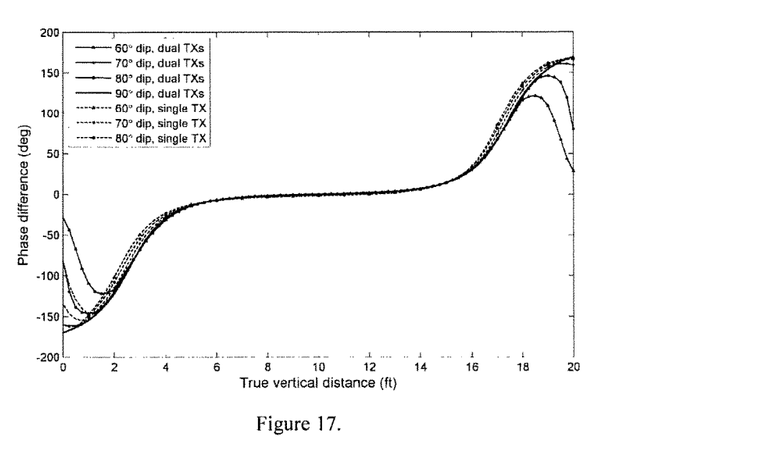
FIG. 17 illustrates azimuthal phase difference responses of single-transmitter and dual transmitter arrays of FIG. 16.

Use of the dual transmitter antennas not only helps reject systematic biases on the azimuthal responses, but also helps simplify the interpretation of the measured responses. To understand, consider a tool crossing the bed boundaries at angle. The tool will have dual transmitters, as shown in FIG. 3. For comparison, a tool with a single transmitter antenna is also considered. In the latter case, the antenna array length will only be half of the dual-transmitters antenna array. In either case, the reference point will be the center of the antenna array. Let the antenna array traverse the bed boundaries at 60°, 70°, 80°, or 90° relative dip angles. The azimuthal attenuation and phase difference responses are shown in FIG. 16 and FIG. 17, respectively. First, observe that the single-transmitter array response is non-symmetric when the tool approaches either the upper or the lower bed boundary, even the top and bottom beds have the same resistivity value. However, the dual-transmitters array produces symmetric responses regardless of dip angle. Second, the dual-transmitters array responses closely resemble each other, especiall when the tool is sufficiently away from any bed boundary. The single-transmitter array responses, however, may show large separations. Therefore, the dual-transmitters array can be more tolerant to dip angle variation. This will make interpretation of the azimuthal responses more robust.

Figure 18:
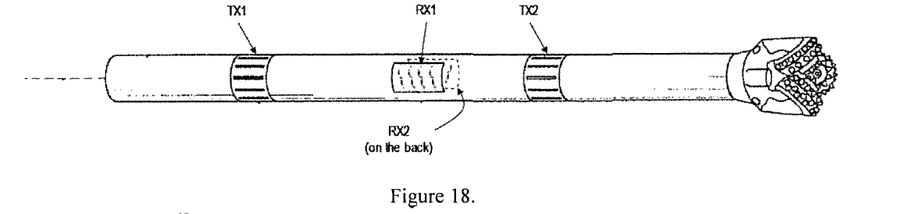
FIG. 18 illustrates a non-symmetric dual-transmitter antenna array according to one or more embodiments.
Figure 19:
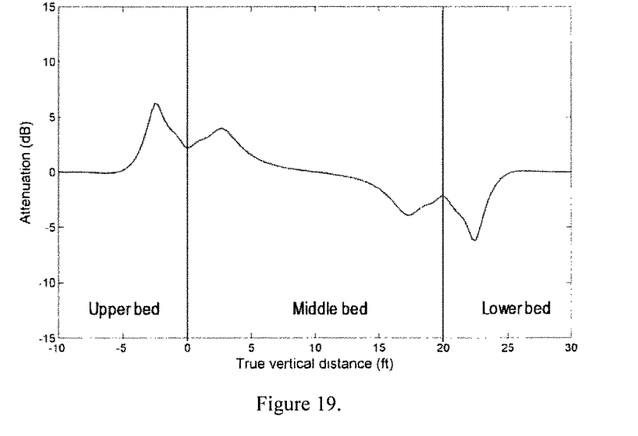
FIG. 19 illustrates azimuthal attenuation response of a non-symmetric antenna array of FIG. 18.
Figure 20:
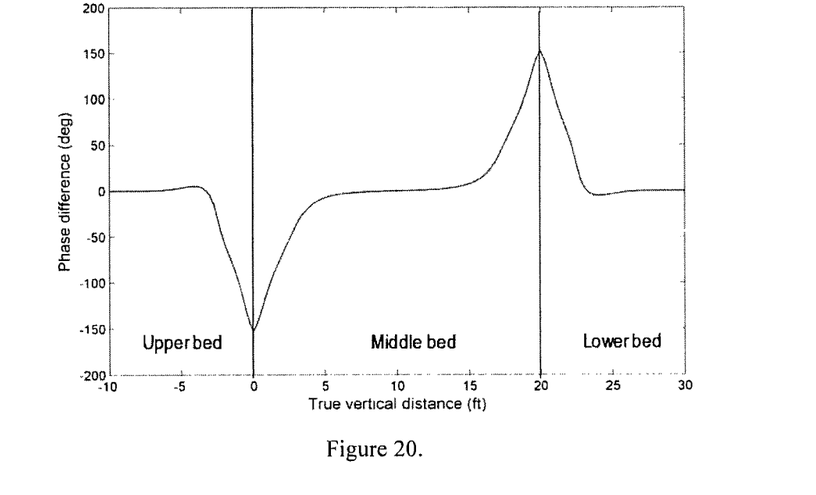
FIG. 20 illustrates azimuthal phase difference of a non-symmetric antenna array of FIG. 18.

In the above, we illustrate the azimuthal antenna array responses to bed boundaries for a symmetric, dual-transmitters antenna array. The two transmitter antennas, however, don't need to be fully symmetric. As FIG. 18 shows, the two transmitter antennas may be arranged asymmetrically with response to the receiver array. This asymmetry will allow for more flexibility in antenna arrangement. A non-symmetric azimuthal antenna array will also produce azimuthally sensitive measurement to a bed boundary. This is illustrated with the same 3-bed formation model shown in FIG. 10. The azimuthal attenuation and phase difference responses of a non-symmetric antenna array are given in FIG. 19 and FIG. 20. The transmitter-to-receiver spacings are 48" and 24", respectively. It is observed that despite of the different values, both attenuation and phase difference responses carry similar azimuthal sensitivity to the bed boundaries to those of a symmetric antenna array.

In the previous description, the transmitter antennas are in the axial direction and the receiver antennas have transversal components. To make an azimuthal measurement, the transmitter antennas can have transversal components and the receiver antennas can be in the axial direction.

Figure 21:
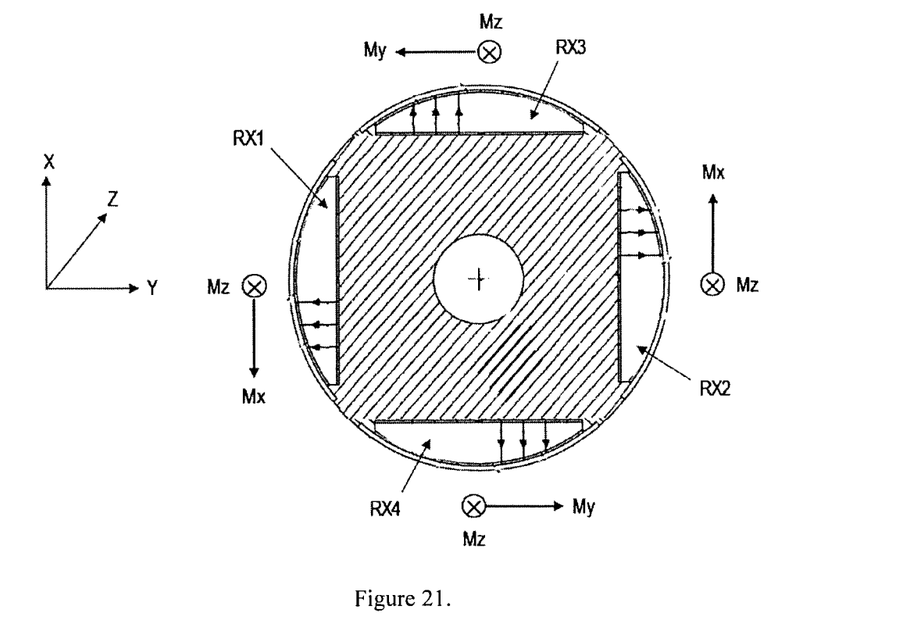
FIG. 21 illustrates a cross section view of an azimuthal antenna having two sets of azimuthal antennas according to one or more embodiments.

With one set of azimuthal receiver antennas described above, it is possible to produce a full set of azimuthal responses at multiple sectors (tool face angles) if the tool or the antenna array rotates around the tool axis. Then the azimuthal responses will allow one to derive information about the azimuth of and distance to a bed boundary. In certain applications, the tool may not rotate and only rotate slowly. For instance, in the sliding mode of directional drilling, the tool string may not rotate at all. In this case, it will not be possible to populate the various azimuthal sectors. To solve this problem, a second set of azimuthal receiver antennas may be employed. As an example, the second set of azimuthal receiver antennas may be constructed as shown in FIG. 21. The second set of azimuthal antennas preferably occupy the same longitudinal position as do the first set, but this is not required. For instance, the first set of azimuthal antennas may be placed closer to the first transmitter antenna and the second set of azimuthal antennas closer to the second transmitter antenna, or vice versa. The transversal components of the second set of azimuthal antennas are preferably orthogonal to those of the first set of azimuthal antennas. Let $AT_1$ and $PD_1$ be the attenuation and phase difference responses from the first set of azimuthal receiver antennas, RX1 and RX2. Let $AT_2$ and $PD_2$ be the attenuation and phase difference responses from the second set of azimuthal receiver antennas, RX3 and RX4. For the sake of discussion, we assume that the second set of azimuthal antennas have the same geometrical and magnetic properties as those of the first set. Then $AT_2$ and $PD_2$ will have similar tool face angle dependence to $AT_1$ and $PD_1$, $$AT_2 \sim \frac{A_{zx}}{A_{zz}\cot\alpha}\cos(\varphi_{zx}-\varphi_{zz})\sin(TF-TF_0) \quad \text{Equation 26}$$

$$PD_2 \sim \frac{A_{zx}}{A_{zz}\cot\alpha}\sin(\varphi_{zx}-\varphi_{zz})\sin(TF-TF_0) \quad \text{Equation 27}$$

Now consider the case in which the tool does not rotate and the tool face angle is fixed at $TF=TF_m$. That is, $$AT_1 \sim \frac{A_{zx}}{A_{zz}\cot\alpha}\cos(\varphi_{zx}-\varphi_{zz})\cos(TF_m-TF_0) \quad \text{Equation 28}$$

$$PD_1 \sim \frac{A_{zx}}{A_{zz}\cot\alpha}\sin(\varphi_{zx}-\varphi_{zz})\cos(TF_m-TF_0) \quad \text{Equation 29}$$

$$AT_2 \sim \frac{A_{zx}}{A_{zz}\cot\alpha}\cos(\varphi_{zx}-\varphi_{zz})\sin(TF_m-TF_0) \quad \text{Equation 30}$$

$$PD_2 \sim \frac{A_{zx}}{A_{zz}\cot\alpha}\sin(\varphi_{zx}-\varphi_{zz})\sin(TF_m-TF_0) \quad \text{Equation 31}$$

From the above four equations, it is easy to derive the following relations $$\frac{A_{zx}}{A_{zz}\cot\alpha}\cos(\varphi_{zx}-\varphi_{zz}) \sim (AT_1^2+AT_2^2)^{\frac{1}{2}} \quad \text{Equation 32}$$

$$\frac{A_{zx}}{A_{zz}\cot\alpha}\sin(\varphi_{zx}-\varphi_{zz}) \sim (PD_1^2+PD_2^2)^{\frac{1}{2}} \quad \text{Equation 33}$$

$$\tan(TF_m-TF_0) \sim \frac{AT_2}{AT_1} \quad \text{Equation 34}$$

$$\tan(TF_m-TF_0) \sim \frac{PD_2}{PD_1} \quad \text{Equation 35}$$

Equation 32 and Equation 33 can be solved for $$\frac{A_{zx}}{A_{zz}\cot\alpha} \text{ and } \varphi_{zx}-\varphi_{zz}.$$

Equation 34 and/or Equation 35 can be solved for $TF_0$. Once all the quantities are solved, attenuation or phase difference responses at any tool face angles can be derived from Equation 24 and Equation 25. These quantities may also be used to derive information about the formation resistivity, distance to and azimuth of an adjacent bed boundary. The information about tool face angle may be acquired with any known sensors such as magnetometers and accelerometers.

Figure 22:
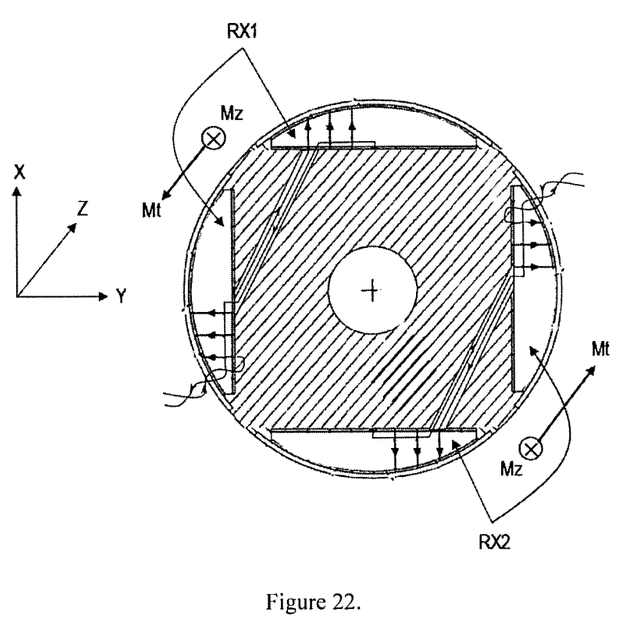
FIG. 22 illustrates a cross section view of azimuthal antennas each including two or more elemental azimuthal antennas according to one or more embodiments.

The two sets of azimuthal antennas shown in FIG. 22 may be combined to form one set of azimuthal antennas. The advantage of the combined antennas is that each will have a larger effective area or magnetic moment. This will help detect a weak signal with higher accuracy. To do so, adjacent elemental azimuthal antennas (e.g., RX1 and RX3, RX2 and RX4) must be wound together such that the resulting transversal components of the elemental azimuthal antennas point to the same circumferential direction. The axial components of the elemental azimuthal antennas must also point to the same direction.

Figure 23:
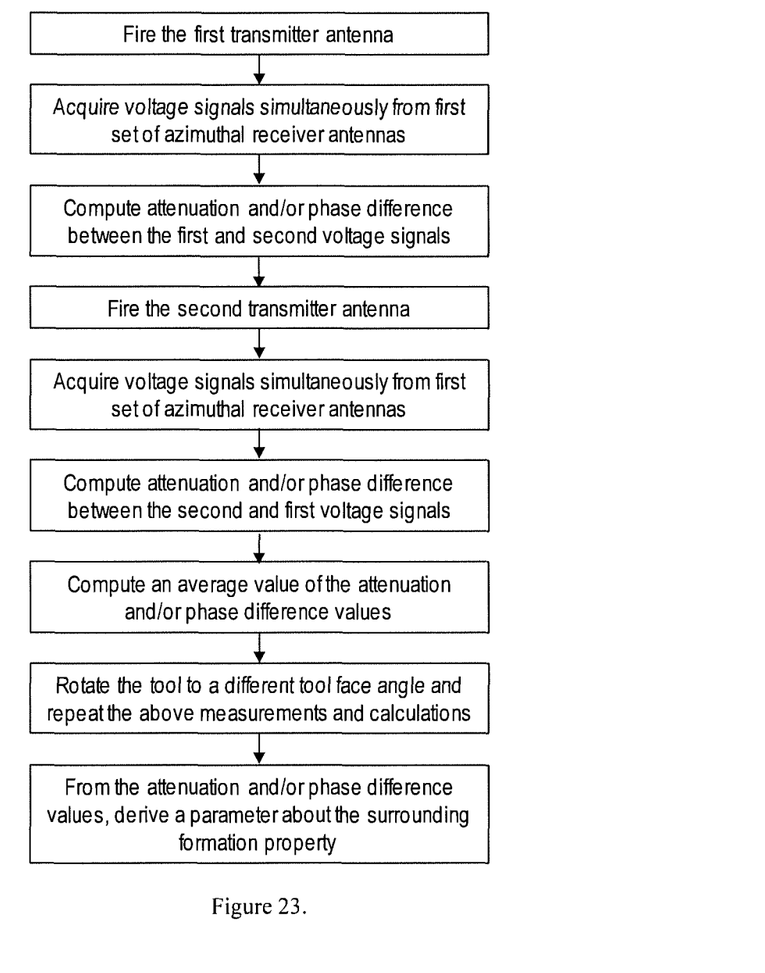
FIG. 23 illustrates a flow chart for a method of measurement according to one or more embodiments.

A flow chart for the method of measurement utilizing the azimuthal antennas according this invention is illustrated in FIG. 23.

The claimed subject matter is not to be limited in scope by the specific embodiments described herein. Indeed, various modifications of the invention in addition to those described herein will become apparent to those skilled in the art from the foregoing description. Such modifications are intended to fall within the scope of the appended claims.

What is claimed is:

1. A resistivity measuring tool used in a drillstring having a drill bit on a distal end for drilling a wellbore in a formation, the tool comprising:
   a tool body having a longitudinal axis;
   a pair of transmitter antennas having magnetic moments parallel to the longitudinal axis of the tool body; and
   a pair of receiver antennas radially spaced from the longitudinal axis of the tool body and having transverse magnetic moment components pointed in opposite directions, wherein at least one of the receiver antennas has a transverse magnetic moment angled with respect to a component normal to the longitudinal axis of the tool body, wherein each of the receiver antennas comprises an antenna body having a longer axis disposed longitudinally in the tool body, wherein each of the receiver antennas comprises a wire coil disposed around the antenna body, and wherein a central axis of the wire coil forms an angle with respect to the longer axis of the antenna body, wherein the angle is in a range from greater than zero degrees to 45 degrees.

2. The tool of claim 1, wherein the pair of receiver antennas are azimuthally spaced apart and disposed at the same longitudinal position on the tool body.

3. The tool of claim 2, wherein the pair of receiver antennas are azimuthally spaced 180 degrees apart.

4. The tool of claim 1, wherein the pair of receiver antennas are disposed within pockets extending radially inward from an outer surface of the tool body.

5. The tool of claim 4, further comprising a non-conducting material disposed within the pocket beneath and around the wire winding.

6. The tool of claim 1, wherein the pair of transmitter antennas each comprise a wire winding that is symmetric about the longitudinal axis of the tool body.

7. The tool of claim 1, further comprising a sensor configured to measure the angular position of the tool body relative to the wellbore.

8. The tool of claim 1, wherein the pair of receiver antennas are located on the longitudinal axis between the transmitter antennas.

9. The tool of claim 8, wherein the pair of receiver antennas are located equidistant from each transmitter antenna.

10. The tool of claim 1, wherein the receiver antennas have magnetic moments comprising a z-component and x-component.

11. The tool of claim 1, wherein the transmitter antennas have magnetic moments comprising a z-component.

* * * * *